(12) United States Patent
Akaike et al.

(10) Patent No.: US 8,926,010 B2
(45) Date of Patent: Jan. 6, 2015

(54) VEHICLE SEAT

(71) Applicant: Toyota Boshoku Kabushiki Kaisha, Aichi-ken (JP)

(72) Inventors: Fumitoshi Akaike, Miyoshi (JP); Takahiro Harita, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 187 days.

(21) Appl. No.: 13/667,230

(22) Filed: Nov. 2, 2012

(65) Prior Publication Data

US 2013/0113239 A1   May 9, 2013

(30) Foreign Application Priority Data

Nov. 4, 2011   (JP) .................................. 2011-242066

(51) Int. Cl.
   *B60N 2/56*   (2006.01)
(52) U.S. Cl.
   CPC .................................... *B60N 2/5685* (2013.01)
   USPC ...................... 297/180.12; 219/217
(58) Field of Classification Search
   USPC ............... 297/180.1, 180.12, 180.13, 180.14; 219/217
   See application file for complete search history.

(56) References Cited

U.S. PATENT DOCUMENTS

| | | | | | |
|---|---|---|---|---|---|
| 4,793,651 | A | * | 12/1988 | Inagaki et al. | 297/180.11 |
| 5,004,294 | A | * | 4/1991 | Lin | 297/180.11 |
| 6,109,688 | A | * | 8/2000 | Wurz et al. | 297/180.14 |
| 7,278,179 | B2 | * | 10/2007 | Schneider | 5/714 |
| 7,461,892 | B2 | * | 12/2008 | Bajic et al. | 297/180.16 |
| 8,403,974 | B2 | * | 3/2013 | Li et al. | 219/217 |
| 2011/0163576 | A1 | * | 7/2011 | Akai et al. | 297/180.12 |

FOREIGN PATENT DOCUMENTS

JP   2008-220399   9/2008

\* cited by examiner

*Primary Examiner* — Peter Brown
(74) *Attorney, Agent, or Firm* — Greenblum & Bernstein, P.L.C.

(57) ABSTRACT

A vehicle seat includes a seat main body, a heating portion provided in the seat main body, a degree-of-contact measuring portion that measures a degree of contact between the seat main body and an occupant seated on the seat main body, and a control portion that controls an amount of heat output from the heating portion such that the amount of heat increases according to an increase in the degree of contact between the seat main body and the occupant, and decreases according to a decrease in the degree of contact between the seat main body and the occupant.

12 Claims, 3 Drawing Sheets

1

VEHICLE SEAT

INCORPORATION BY REFERENCE

The disclosure of Japanese Patent Application No. 2011-242066 filed on Nov. 4, 2011 including the specification, drawings and abstract is incorporated herein by reference in its entirety.

BACKGROUND OF THE INVENTION

1. Field of the Invention

The invention relates to a vehicle seat provided with heating portion (i.e., a heater device) that warms an occupant.

2. Description of Related Art

Japanese Patent Application Publication No. 2008-220399 (JP 2008-220399 A) describes a vehicle seat provided with heating means. In the vehicle seat described in JP 2008-220399 A, control is performed to increase an amount of heat output from the heating means when a degree of contact between an occupant and a seat decreases, and decrease the amount of heat output from the heating means when the degree of contact increases. Performing control in this way makes it possible to give the occupant a uniform sense of warmth.

However, with the vehicle seat described in JP 2008-220399 A, when the degree of contact between the occupant and the seat decreases, it is not possible to give the occupant a uniform sense of warmth unless the amount of heat output from the heating means is significantly increased. For example, when the occupant is separated from the seat, heat output from the heating means is no longer able to be applied directly to the occupant (i.e., heat can only transferred through air or the like). Therefore, energy efficiency will be poor unless the heating means significantly increases the amount of heat.

SUMMARY OF THE INVENTION

The invention thus provides a vehicle seat capable of efficiently warming an occupant by a heating portion.

One aspect of the invention relates to a vehicle seat that includes a seat main body, a heating portion provided in the seat main body, a degree-of-contact measuring portion that measures a degree of contact between the seat main body and an occupant seated on the seat main body, and a control portion that controls an amount of heat output from the heating portion such that the amount of heat increases according to an increase in the degree of contact between the seat main body and the occupant.

Also, another aspect of the invention relates to a vehicle seat that includes a seat main body, a heating portion provided in the seat main body, a degree-of-contact measuring portion that measures a degree of contact between the seat main body and an occupant seated on the seat main body, and a control portion that controls an amount of heat output from the heating portion such that the amount of heat decreases according to a decrease in the degree of contact between the seat main body and the occupant.

According to the aspects of the invention described above, the amount of heat output from the heating portion is increased when the degree of contact between the seat main body and the occupant increases, or is decreased when the degree of contact between the seat main body and the occupant decreases. That is, the occupant (i.e., part of the body of the occupant) is heated when the occupant (i.e., part of the body of the occupant) is sufficiently contacting the seat main body, so the occupant is able to be warmed effectively. In other words, when the occupant is not sufficiently contacting the seat main body (including when the occupant is separated from the seat main body), it is determined that the occupant is unable to be warmed efficiently, so the amount of heat that is output is reduced, thereby enabling wasteful consumption of heat energy to be suppressed.

Also, the control portion may place the heating portion in a heat retaining state when it is determined that the occupant is not contacting the seat main body according to the degree-of-contact measuring portion.

When the occupant is not contacting the seat main body, even if the amount of heat that is output is increased, almost none of that heat will be transferred to the occupant. Therefore, it is not necessary to consume heat energy to warm the occupant. Also, there are times when, due to a change in posture of the occupant or the like, the state may change from a state in which the occupant is not contacting the seat main body to a state in which the occupant is contacting the seat main body. In such a case, the occupant is able to be warmed quickly if the heating portion is placed in a heat retaining state when the occupant is not contacting the seat main body.

According to the vehicle seat having this structure, the amount of heat output from the heating portion is increased when the occupant is able to be heated effectively, so wasteful consumption of heat energy by the heating portion is able to be suppressed. That is, energy efficiency is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
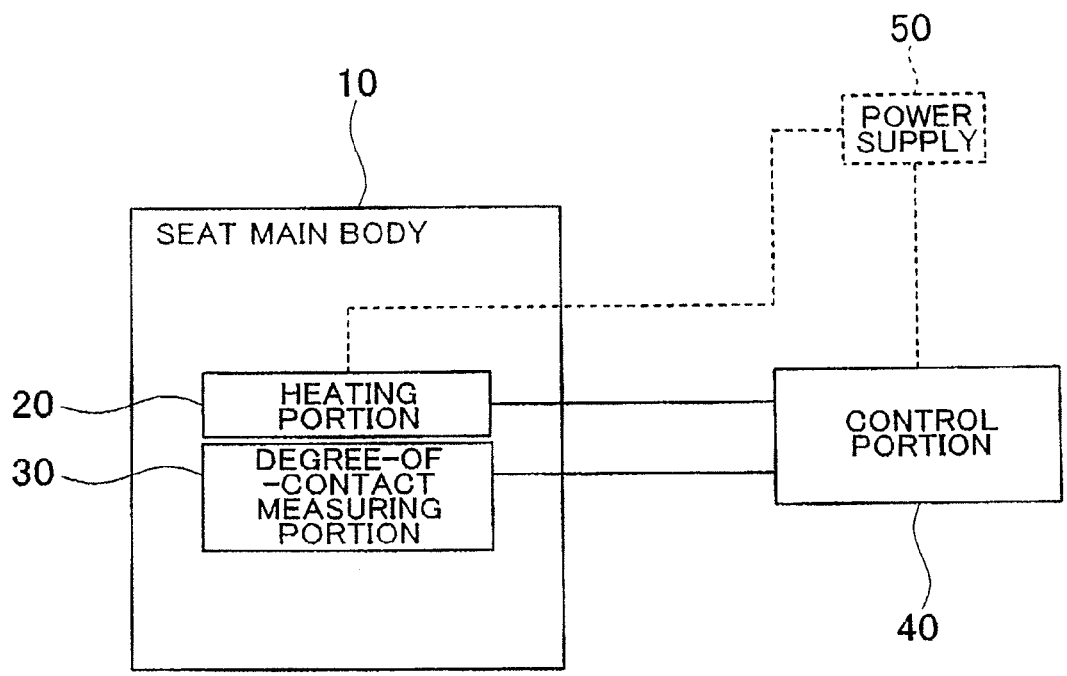
FIG. 1 is a block diagram of a vehicle seat according to one example embodiment of the invention.

Hereinafter, example embodiments of the invention will be described in detail with reference to the accompanying drawings. A vehicle seat I according to one example embodiment includes a seat main body 10, a heating portion 20, a degree-of-contact measuring portion 30, and a control portion 40. Each of these structures will be described below.

The seat main body 10 may be a well-known seat main body having a seat back 11 (a backrest portion) and a seat cushion 12 (a seating portion) and the like. The seat back 11 and the seat cushion 12 have a seat pad and seat cover that covers at least a surface of the seat pad. The seat pad is fixed to a seat frame that serves as the frame of the seat.

Figure 2:
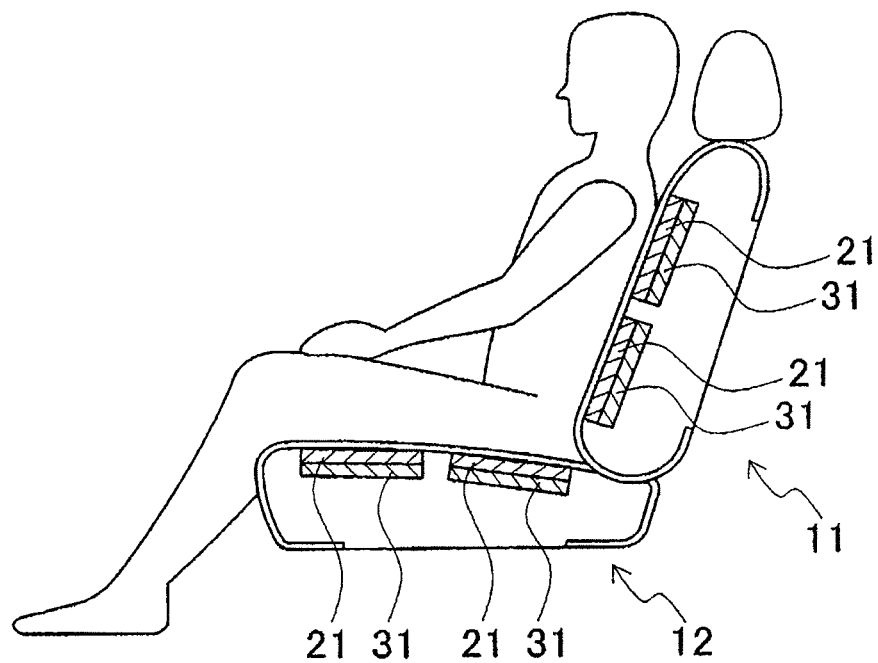
FIG. 2 is a view of the overall structure of the vehicle seat according to the example embodiment of the invention.

The heating portion 20 is a heater device that warms an occupant, and is typically provided between the seat cover and the seat pad. A heater portion 21 of the heater device may be sheet-shaped with heating wires sewn into fabric that is base material, for example. The heating portion 20 may also be such that the heater portion 21 is divided appropriately and arranged in the seat main body 10, e.g., on the upper and lower sides of the seat back 11, and on the front and rear sides of the seat cushion 12, as shown in FIG. 2. The heater portions 21 (i.e., the heating wires) are electrically connected to a power supply 50 (i.e., a power supply mounted in the vehicle). The control portion 40 is able to adjust the amount of heat that is output by increasing and decreasing the amount of electric power to the heater portions 21 (i.e., the heating wires). Also, the amount of heat that is output is able to be controlled independently for each of the divided areas (i.e., each of the heater portions 21).

The degree-of-contact measuring portion 30 measures the degree of contact between the seat main body 10 (i.e., the seat back 11 and the seat cushion 12) and the occupant. Various indexes for this degree of contact are conceivable, but in this example embodiment, a pressure sensor 31 (such as a capacitance pressure sensor 31) will be used. At least a portion of the pressure sensor 31 is arranged overlapping with the heater portions 21. As described above, when the heating portion 20 has a plurality of heater portions 21, a pressure sensor 31 is provided corresponding to each heater portion 21. That is, the pressure from an occupant in positions where the heater portions 21 are provided is able to be measured. The control portion 40 determines that the degree of contact between the occupant and the seat main body 10 to be higher as the pressure measured by the degree-of-contact measuring portion 30 increases. When the measured pressure is approximately zero (i.e., when the measured pressure excluding pressure from the weight of the seat cover and the heater portions 21 and the like, that is, when the pressure applied by the presence of an occupant, is zero), the control portion 40 determines that the occupant is not contacting the seat main body 10.

The control portion 40 controls the amount of electric power to the heating wires of the heating portion 20 based on the pressure measured by the degree-of-contact measuring portion 30. That is, the amount of heat that is output from the heating portion 20 is controlled based on the degree of contact between the occupant and the seat main body 10. This will be described in detail below.

First, the control portion 40 obtains the degree of contact (i.e., pressure) measured by the degree-of-contact measuring portion 30. The control portion 40 then adjusts the current such that current according to this degree of contact is supplied to the heater portions 21 (i.e., the heating wires). When the degree of contact measured by the degree-of-contact measuring portion 30 increases (i.e., when the pressure increases), the control portion 40 adjusts the amount of current supplied to the heater portions 21 (i.e., the heating wires) so that it increases. That is, the control portion 40 controls the amount of heat output from the heating portion 20 so that it increases. Here, the relationship between the degree of contact and the amount of heat output from the heating portion 20 is able to be set appropriately as long as it is a relationship in which the amount of heat output from the heating portion 20 increases according to an increase in the degree of contact. The relationship between the degree of contact and the amount of heat may be a proportional relationship, or it may be an exponentially increasing relationship. Also, the relationship between the degree of contact and the amount of heat may be changed according to the external environment such as the season and the outside air temperature and the like. This makes it possible to accommodate changes in the degree of comfort of the seating environment that differs depending on the external environment such as the season and the outside air temperature and the like. Also, the relationship between the degree of contact and the amount of heat may be changed by being set by the occupant. This enables the occupant to change the way in which the amount of heat is provided with respect to the degree of contact to a way that is preferred by the occupant, and thus enables the seating environment to be improved.

Moreover, when the degree of contact measured by the degree-of-contact measuring portion 30 decreases (i.e., when the pressure decreases), the control portion 40 adjusts the amount of current supplied to the heater portions 21 (i.e., the heating wires) so that it decreases. That is, the control portion 40 controls the amount of heat output from the heating portion 20 so that it decreases. Here, the relationship between the degree of contact and the amount of heat output from the heating portion 20 may be adjusted appropriately as long as it is a relationship in which the amount of heat output from the heating portion 20 decreases according to a decrease in the degree of contact. The relationship between the degree of contact and the amount of heat may be a proportional relationship, or it may be an exponentially decreasing relationship. Also, the relationship between the degree of contact and the amount of heat may be changed according to the external environment such as the season and the outside air temperature and the like. This makes it possible to accommodate changes in the degree of comfort of the seating environment that differs depending on the external environment such as the season and the outside air temperature and the like. Also, the relationship between the degree of contact and the amount. of heat may be changed by being set by the occupant. This enables the occupant to change the way in which the amount of heat is provided with respect to the degree of contact to a setting preferred by the occupant, and thus makes it possible to accommodate degrees of comfort of the seating environment that differ depending on the occupant.

In this way, the vehicle seat 1 according to this example embodiment is configured such that the amount of heat output from the heating portion 20 increases according to an increase in the degree of contact between the occupant and the seat main body 10, based on the idea that the occupant can be warmed effectively especially when the occupant is sufficiently contacting the seat main body 10. Therefore, the occupant is able to be warmed effectively. Also, the vehicle seat 1 according to this example embodiment is configured such that the amount of heat output from the heating portion 20 decreases according to a decrease in the degree of contact between the occupant and the seat main body 10, based on the idea that the occupant is unable to be warmed efficiently when the occupant is not sufficiently contacting the seat main body 10. Therefore, wasteful consumption of heat energy by the heating portion 20 is able to be suppressed. That is, energy is consumed in a state or location in which the occupant can be warmed effectively, and energy consumption is suppressed as much as possible in a state or location in which the occupant is not able to be warmed effectively. As a result, energy efficiency is improved. That is, the ratio of energy transferred as heat to the occupant to the total energy consumed is able to be increased.

Also, when the pressure measured by the degree-of-contact measuring portion 30 is substantially zero (as described above), that is, when it is determined that the occupant is not contacting the seat main body 10, the heating portion 20 is placed in a heat retaining state. That is, even if the occupant is not contacting the seat main body 10, the amount of heat output from the heating portion 20 is not set to zero. This is because if the amount of heat output from the heating portion 20 were to be set to zero, it would take time for the heater portions 21 to heat up when the heating portion 20 was operated again. That is, even if the occupant is not contacting the seat main body 10, the heater portions 21 are kept at a certain temperature, so when the occupant thereafter contacts the seat main body 10, the occupant is able to be warmed quickly. Also, according to this structure, the seat will not feel cold to the occupant when the occupant contacts the seat main body 10.

Based on this, the temperature of the heat retaining state is set to a temperature that is able to quickly heat the heater portions 21 to a predetermined temperature, and at which the seat will not feel cold to the occupant. Therefore, the temperature of the heat retaining state may be changed according to the external environment such as the season and the outside air temperature and the like. More specifically, in order to make the seat not feel cold to the occupant when the occupant contacts the seat main body 10, the temperature of the heat retaining state may be set to a higher temperature than the outside air temperature (i.e., the outside air temperature+α). This makes it possible to accommodate a change in the degree of comfort of the seating environment that differs depending on the external environment such as the season and the outside air temperature and the like, Also, the temperature of the retaining state may be able to be changed by being set by the occupant. This makes it possible to accommodate degrees of comfort of the seating environment that differ according to the occupant.

When the heating portion 20 has a plurality of heater portions 21 and the degree-of-contact measuring portion 30 has a pressure sensor 31 corresponding to each of the heater portions 21 as in this example embodiment, the control described above is performed for each of the heater portions 21. That is, the amount of heat output from each of the heater portions 21 is adjusted as described above, according to the pressure (i.e., the degree of contact) measured by each of the pressure sensors 31. The number (the divided number) of the heater portions 21 and the pressure sensors 31 corresponding to these heater portions 21, and the arrangement and the like thereof, may be set as appropriate.

Figure 3:
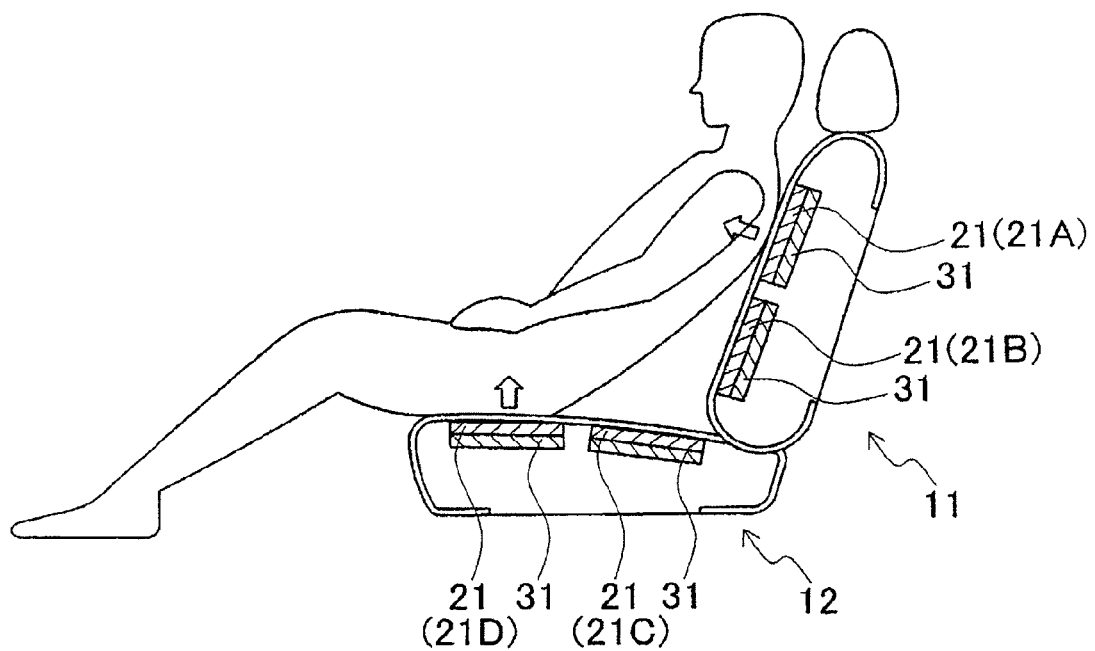
FIG. 3 is a view of a state in which an occupant is not contacting a lower side of a seat back and a rear side of a seat cushion.

For example, when the heater portions 21 are divided into heater portions 21 for the upper and lower sides of the seat back 11 and the front and rear sides of the seat cushion 12, and arranged in the seat main body 10, the occupant contacts the upper side of the seat back 11 and the front side of the seat cushion 12 when in a posture such as that shown in FIG. 3. Therefore, an amount of heat corresponding to the degree of contact (i.e., the pressure) between the occupant and the seat at these portions is output from the heater portion 21A and the heater portion 21D. On the other hand, the occupant is not contacting the lower side of the seat back 11 and the rear side of the seat cushion 12, so the heater portion 21B and the heater portion 21C are placed in the heat retaining state. Also, when the occupant is not contacting the upper side of the seat back 11 and is contacting the lower side of the seat back 11 and the seat cushion 12, only the heater portion 21A is placed in the heat retaining state.

As described above, the heater portions 21 can be controlled independently, but they may also be configured such that when a given heater portion 21 is controlled, the temperature of this heater portion 21 is increased or decreased somewhat by the temperature of a heater portion 21 that is adjacent to this heater portion or the like. That is, when setting the temperature of a given area, the temperature may be increased or decreased somewhat based on the condition of an area adjacent to this area. Depending on the sitting posture of the occupant, there may also be cases in which it is difficult to obtain the condition (i.e., the temperature or the pressure) of a given heater portion (i.e., the area). However, according to the structure described above, a condition similar to the condition of the area is able to be obtained, and the amount of heat output from the heating portion 20 is able to be controlled more appropriately compared with when a given heater portion 21 is controlled not based on the condition of an area adjacent to the area.

While example embodiments of the invention have been described in detail, the invention is not limited to the example embodiments described above, but may be carried out in various modified modes within the scope of the invention.

What is claimed is:

1. A vehicle seat comprising:
a seat main body;
a heating portion provided in the seat main body;
a degree-of-contact measuring portion that measures a degree of contact between the seat main body and an occupant seated on the seat main body, the degree-of-contact measuring portion being provided in the seat main body; and
a control portion that communicates with the degree-of-contact measuring portion, monitors the degree of contact between the seat main body and the occupant seated on the seat main body measured by the degree-of-contact measuring portion and controls an amount of heat output from the heating portion such that the amount of heat increases according to an increase in the degree of contact between the seat main body and the occupant, wherein
the heating portion is divided into a plurality of heating portions, and the degree-of-contact measuring portion is arranged for each heating portion; and
the control portion controls the amount of heat output from one of the heating portions such that the amount of heat increases according to an increase in the degree of contact measured by a degree-of-contact measuring portion corresponding to another heating portion that is adjacent to the one heating portion.

2. The vehicle seat according to claim 1, wherein
the control portion places the heating portion in a heat retaining state when it is determined that the occupant is not contacting the seat main body according to the degree-of-contact measuring portion.

3. The vehicle seat according to claim 2, wherein
a temperature of the heat retaining state is changed according to an external environment.

4. The vehicle seat according to claim 2, wherein
a temperature of the heat retaining state is changed by the occupant.

5. The vehicle seat according to claim 1, wherein
a relationship between the amount of heat output from the heating portion and the degree of contact when the control portion controls the amount of heat output from the heating portion according to the degree of contact is changed according to an external environment.

6. The vehicle seat according to claim 1, wherein
a relationship between the amount of heat output from the heating portion and the degree of contact when the control portion controls the amount of heat output from the heating portion according to the degree of contact is changed by the occupant.

7. A vehicle seat comprising:
a seat main body;
a heating portion provided in the seat main body;
a degree-of-contact measuring portion that measures a degree of contact between the seat main body and an occupant seated on the seat main body, the degree of measuring portion being provided in the seat main body; and
a control portion that communicates with the degree-of-contact measuring portion, monitors the degree of contact between the seat main body and the occupant seated on the seat main body measured by the degree-of-contact measuring portion and controls an amount of heat output from the heating portion such that the amount of heat decreases according to a decrease in the degree of contact between the seat main body and the occupant, wherein the heating portion is divided into a plurality of heating portions, and the degree-of-contact measuring portion is arranged for each heating portion; and the control portion controls the amount of heat output from one of the heating portions such that the amount of heat decreases according to a decrease in the degree of contact measured by a degree-of-contact measuring portion corresponding to another heating portion that is adjacent to the one heating portion.

8. The vehicle seat according to claim 7, wherein the control portion places the heating portion in a heat retaining state when it is determined that the occupant is not contacting the seat main body according to the degree-of-contact measuring portion.

9. The vehicle seat according to claim 8, wherein a temperature of the heat retaining state is changed according to an external environment.

10. The vehicle seat according to claim 8, wherein a temperature of the heat retaining state is changed by the occupant.

11. The vehicle seat according to claim 7, wherein a relationship between the amount of heat output from the heating portion and the degree of contact when the control portion controls the amount of heat output from the heating portion according to the degree of contact is changed according to an external environment.

12. The vehicle seat according to claim 7, wherein a relationship between the amount of heat output from the heating portion and the degree of contact when the control portion controls the amount of heat output from the heating portion according to the degree of contact is changed by the occupant.

* * * * *